United States Patent
Wilcox

[11] Patent Number: 5,926,997
[45] Date of Patent: Jul. 27, 1999

[54] STATIONARY VACUUM TRAP FOR VERMIN

[76] Inventor: Richard W. Wilcox, R.R. 3, P.O. Box 295, Sparta, Wis. 54656

[21] Appl. No.: 08/914,974

[22] Filed: Aug. 20, 1997

[51] Int. Cl.⁶ .......................... A01M 23/16; A01M 23/18
[52] U.S. Cl. ............................... 43/60; 43/121; 43/132.1; 43/58; 43/64
[58] Field of Search .................................. 43/132.1, 107, 43/121, 122, 123, 139, 140, 138, 60, 58, 64

[56] References Cited

U.S. PATENT DOCUMENTS

| | | | |
|---|---|---|---|
| 4,048,747 | 9/1977 | Shanahan et al. | 43/114 |
| 4,279,095 | 7/1981 | Aasen | 43/139 |
| 4,411,094 | 10/1983 | Spackova et al. | 43/121 |
| 4,965,959 | 10/1990 | Gagne' | 43/61 |
| 4,979,330 | 12/1990 | Rorant | 43/139 |
| 5,052,147 | 10/1991 | Broomfield et al. | 43/139 |
| 5,123,201 | 6/1992 | Reiter | 43/107 |
| 5,305,495 | 4/1994 | Nelsen et al. | 15/414 |
| 5,560,146 | 10/1996 | Garro | 43/74 |
| 5,815,982 | 10/1998 | Garretson | 43/121 |

Primary Examiner—Jack W. Lavinder
Attorney, Agent, or Firm—Robert J. Harter

[57] ABSTRACT

A cockroach trap includes floor molding that is hollowed out in back to provide a passage running the length of the molding. Slits along the bottom of the molding allow a cockroach to enter the passage where it steps onto a touch-sensitive switch. The switch causes a control to momentarily energize a vacuum that sucks the cockroach from the passage and deposit it into a chamber where it can be destroyed or stored alive.

6 Claims, 5 Drawing Sheets

STATIONARY VACUUM TRAP FOR VERMIN

BACKGROUND OF THE INVENTION

1. Field of the Invention

The subject invention generally pertains to vermin traps, and more specifically to those employing a vacuum.

2. Description of Related Art

Today's bug-sucking traps are hand-held and an operator must actively pursue each bug. This is impractical in situations where there may be thousands of bugs. Since the devices are hand-held, their storage capacity of trapped bugs is very limited and the maximum vermin size is also limited significantly. Another drawback is that bugs typically flee when pursued.

SUMMARY OF THE INVENTION

To overcome the limitations of present bug-sucking traps it is a primary object of the invention to quietly lure a vermin into the entrance of a passive trap and then automatically actuate the vacuum after the vermin enters under it's own power and free will.

A second object is to provide a stationary trap entrance having no moving parts that may startle vermin.

A third object is to provide a stationary vacuum source and stationary vermin storage that is remote from the trap entrance to facilitate trapping relatively large vermin such as mice and rats.

A fourth object is to lure roaches by virtue of their attraction to dark corners, thereby eliminating the need for bait that may eventually spoil.

A fifth object is to eliminate the need for toxic pesticides.

A sixth object is to provide a trap requiring no manual intervention by having an automatically actuated discharge flapper that opens to release trapped vermin when the vacuum is off.

A seventh object is to provide vacuum conduit with a reconnectable joint to facilitate servicing the interior of the conduit.

An eighth object is to provide a control that automatically turns the vacuum on only when needed.

A ninth object is to provide a trap that is self-cleaning, i.e., dirt and dust that may accumulate in the trap will eventually be vacuumed up.

A tenth object is to provide a vermin trap that lends itself well for connection to a central vacuum system in a home.

An eleventh object is to provide a trap having unlimited storage by virtue of a discharge flapper that automatically expels trapped bugs from the trap.

A twelfth object is to provide a trap that can work in conjunction with a variety of ways to destroy trapped vermin including electrocution, cutting, crushing and poisoning.

A thirteenth object is to optionally trap vermin unharmed and release them live to the outdoors through a discharge flapper.

A fourteenth object is to provide a trap adapted for mounting along the floor, ceiling, and windows of a building or mounting above cattle in a barn.

These and other objects of the invention are provided by a novel vermin trap comprising a stationary conduit that passively lures vermin into it. A control automatically turns a vacuum momentarily on and off to suck the vermin from the conduit and into a storage container for destruction or later release.

DESCRIPTION OF THE PREFERRED EMBODIMENT

Figure 1:
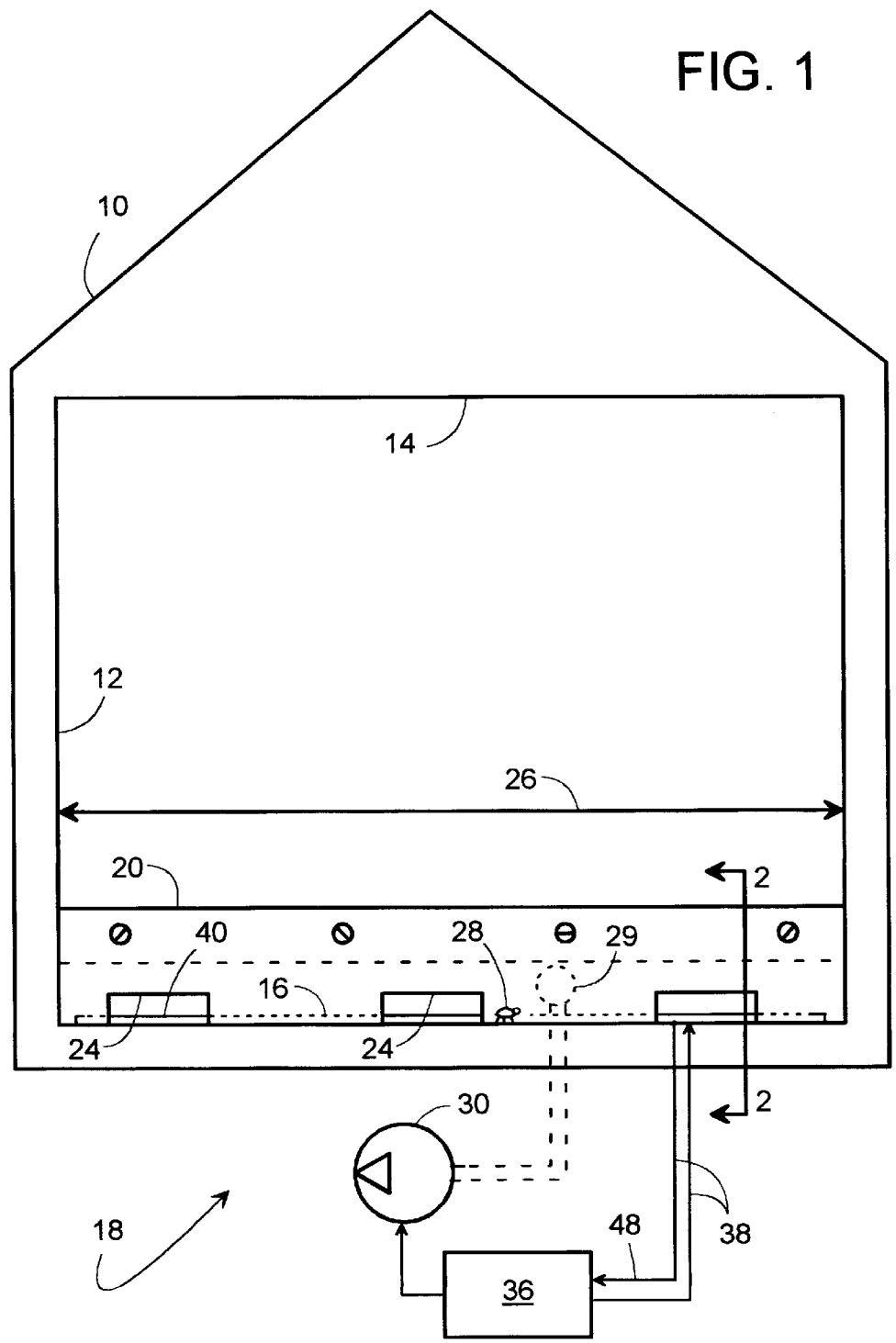
FIG. 1 is a front schematic view of the invention.
Figure 2:
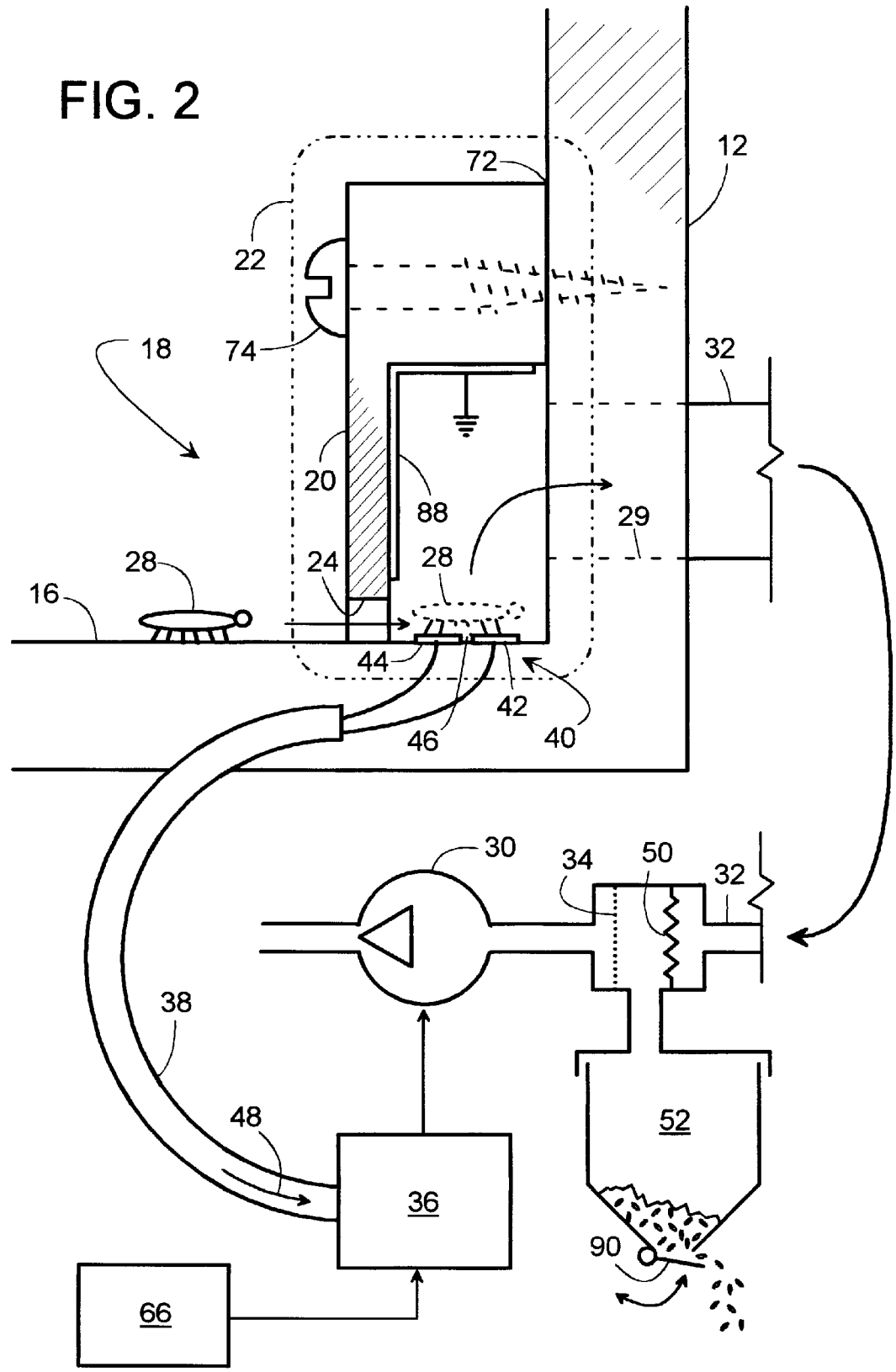
FIG. 2 is a cross-sectional view taken along line 2—2 of FIG. 1.

Referring to FIGS. 1 and 2, a building 10 having walls 12, a ceiling 14, and a floor 16 is shown with a trap 18 comprising floor molding 20 that upon attaching to floor 16 provides a conduit 22. Conduit 22 includes a plurality of slits 24 that run parallel to a longitudinal length 26 of conduit 22. Slits 24 provide an upstream opening to receive vermin 28. A downstream opening 29 expels vermin 28 out through conduit 22. A vacuum pump 30 is in fluid communication with downstream opening 29 of conduit 22 by way of hose 32 and filter 34. Vacuum pump 30 is controlled by an automatic control 36 that is connected via cable 38 to a touch-sensitive switch 40. Switch 40 includes two bare electrical conductors 42 and 44 that run lengthwise along conduit 22 and are spaced apart from each other to define a gap 46.

In response to vermin 28 crawling through slit 24 and stepping onto switch 40, switch 40 provides a feedback signal 48 to control 36 which momentarily turns vacuum pump 30 on for 3 seconds. This sucks vermin 28 from conduit 22, through downstream opening 29, through hose 32, past a vermin-killing electrode 50, and finally deposited into a vermin storage chamber 52. Control 36 resets automatically so trap 18 is ready to trap the next vermin 28 without any human intervention.

Figure 3:
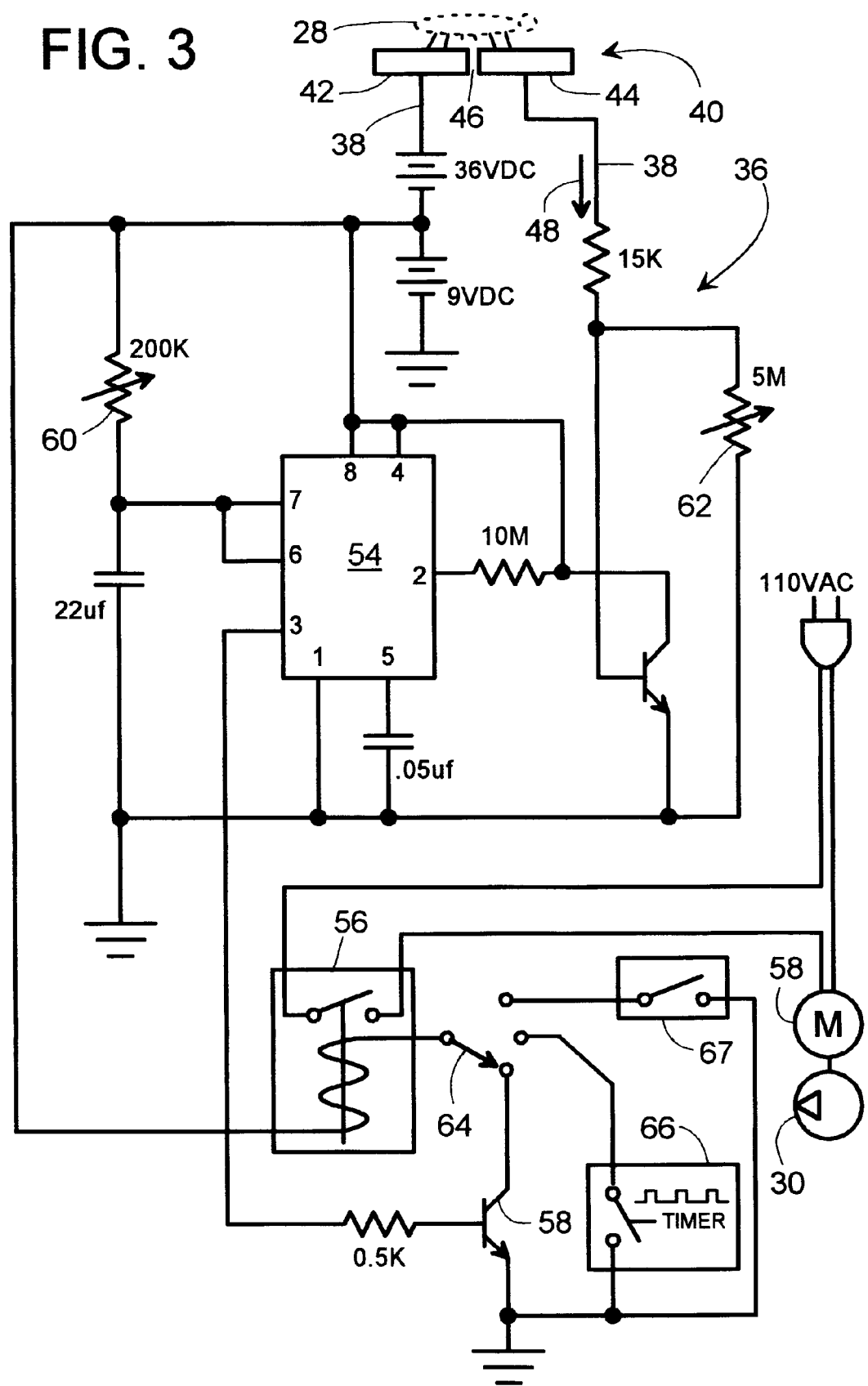
FIG. 3 is a schematic diagram of a control.

The details of control 36 are shown in FIG. 3. An IC chip 54 is a 555 timer that controls the operation of a relay 56 which turns motor 58 of vacuum pump 30 on momentarily, then off. Voltage on conductor 44 provides feedback signal 48 as the body of vermin 28 conducts current from conductor 42 to conductor 44. This feedback signal triggers timer 54 to provide a one-shot impulse that momentarily energizes relay 56 by way of an npn transistor 58. Potentiometer 60 controls the duration of the vacuum cycle, and potentiometer 62 controls the sensitivity of switch 40.

A switch 64 provides an option of disabling touch-sensitive switch 40 and using an on-off timer 66 that just turns vacuum pump 30 on for a minute or so, every hour (i.e., turning pump 30 on and off as a function of time).

Figure 4:
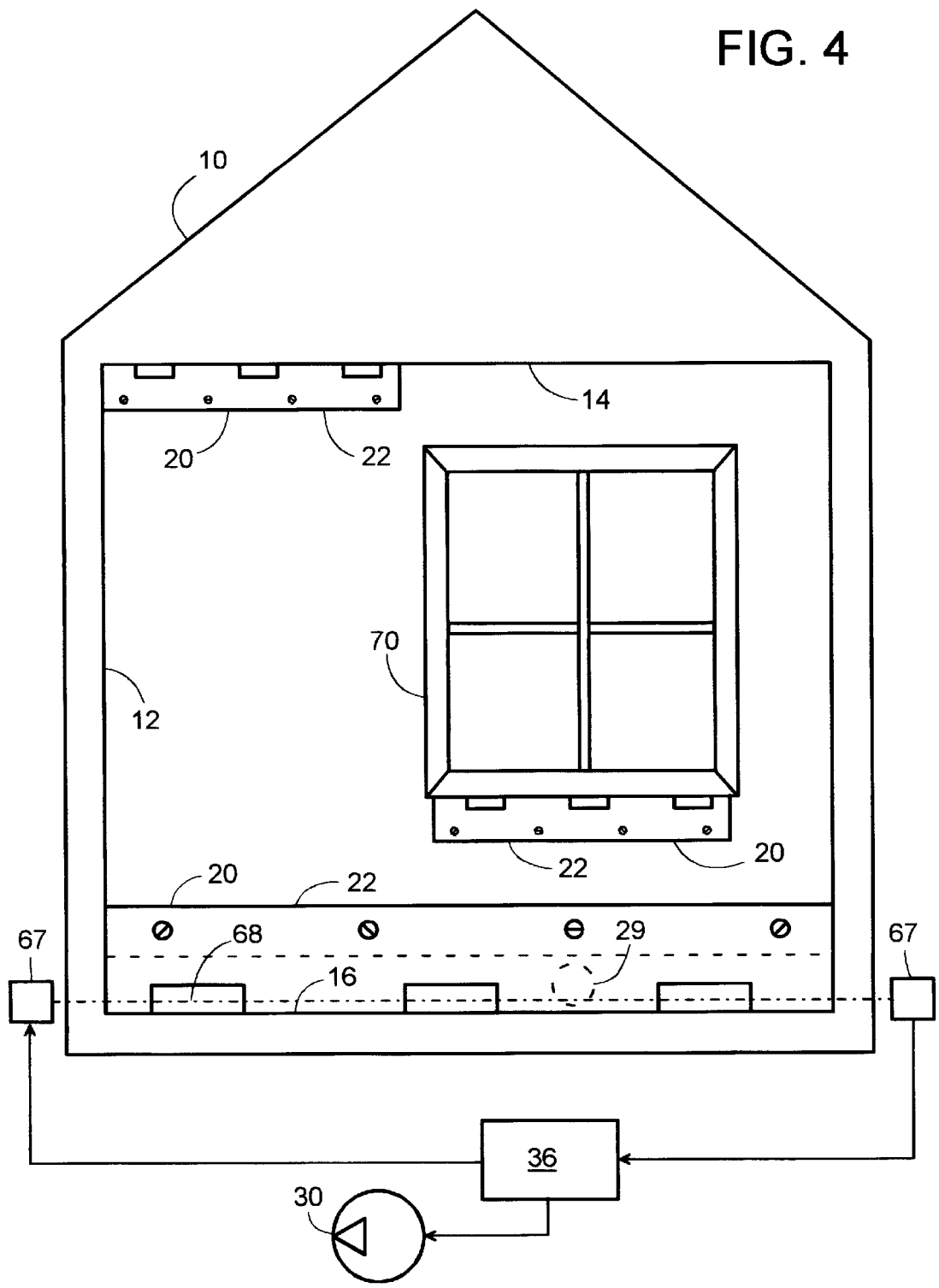
FIG. 4 is another front schematic view of the invention.

Switch 64 also provides the option of actuating vacuum pump 30 in response to an electric eye 67 (see FIG. 4). In this mode, vacuum is turned on upon vermin 28 interrupting light beam 68 of electric eye 67.

FIG. 4 also shows conduit 22 incorporating ceiling 14, where ceiling 14 intersects wall 12. Also shown is another conduit 22 associated with a window 70.

In the event that conduit 22 gets plugged, conduit 22 can be opened for access by virtue of a reconnectable joint 72 between molding 20 and wall 12 (see FIG. 2). Joint 72 is opened and closed by way of screws 74.

Figure 5:
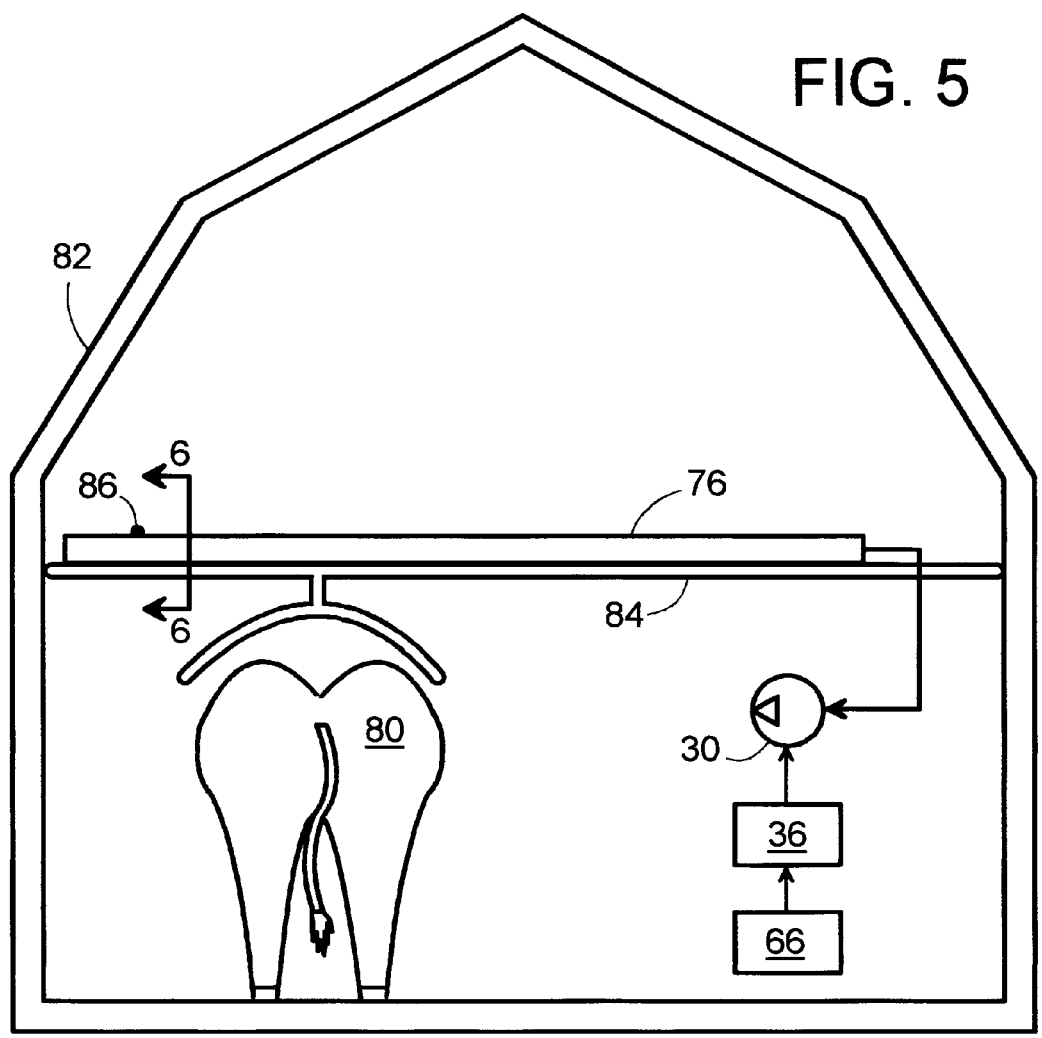
FIG. 5 illustrates an embodiment of the invention in a barn.
Figure 6:
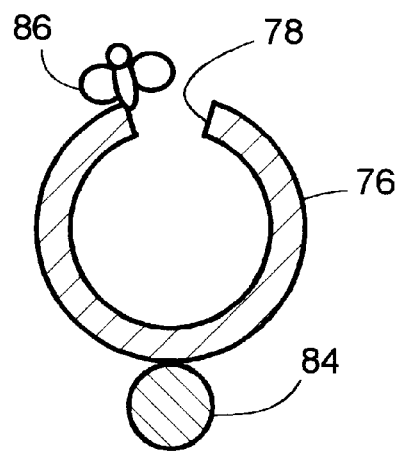
FIG. 6 is a cross-sectional view taken along line 6—6 of FIG. 5.

In another embodiment of the invention, shown in FIGS. 5 and 6, a conduit 76 having a continuous longitudinal slit 78 is situated over a cow 80 in a barn 82. Conduit 76 is positioned just above an electrode 84 that serves to keep cow 80 in a desired position. Any flies 86 (or other small vermin) on conduit 76 will be periodically sucked away. For this embodiment of the invention, timer 66 is used instead of touch-sensitive switch 40.

Other optional features are shown in FIG. 2. Grounded shield 88 shields switch 40 from stray electromagnetic radiation (e.g., electrical noise and radio waves) to prevent false trips. Discharge flapper 90 facilitates emptying chamber 52. Flapper 90 can be actuated in any number of ways including, but not limited to vacuum actuation or manually operated periodically. Vermin-killing electrode 50 is schematically illustrated to represent any number of ways of destroying vermin 28. Examples of item 50 include, but are not limited to high voltage electrodes, cutting blades, heater, poison, oil bath, and crushing rollers.

Although one trap 18 was primarily intended for cockroaches, it should be mentioned that, for the purpose of this invention, the term "vermin" refers to any creature that can be sucked through an appropriately-sized conduit. Examples of vermin include, but are not limited to: cockroaches, ants, flies, bugs, insects, rodents, mice and termites.

Although the invention is described with respect to a preferred embodiment, modifications thereto will be apparent to those skilled in the art. Therefore, the scope of the invention is to be determined by reference to the claims which follow.

I claim:

1. A system for automatically trapping and catching vermin that are able to travel within a building, comprising:
    a molding mounted substantially stationary relative to said building and disposed lengthwise along an intersection of a wall and a floor of said building to form a conduit which defines, a plurality of upstream openings spaced apart along a length of said conduit to receive said vermin into said conduit and a downstream opening to expel said vermin out through said conduit,
    a touch-sensitive switch disposed within said conduit and responsive to electrically coupled to said touch-sensitive switch and said vacuum pump to momentarily turn said vacuum pump on in response to said vermin touching said touch-sensitive switch, at least one of said plurality of upstream openings remaining open when said vacuum pump is turned on to facilitate said vermin being sucked through said conduit.

2. The trap as recited in claim 1 wherein said touch-sensitive switch includes two conductors that remain stationary and are spaced apart to define a gap therebetween, said gap being adapted to be bridged by said vermin, thereby electrically coupling said two conductors by way of said vermin itself.

3. The trap as recited in claim 1 wherein said upstream opening is a slit running substantially parallel to a longitudinal length of said conduit.

4. The trap as recited in claim 1 wherein said upstream opening comprises a plurality of spaced-apart slits running substantially parallel to a longitudinal length of said conduit.

5. The trap as recited in claim 1 further comprising a said molding having a reconnectable joint extending along a longitudinal length therefore to provide personal access inside said conduit for the purpose of maintenance and cleaning.

6. A system for automatically trapping and catching vermin that are able to travel within a building, comprising:
    a molding being mounted substantially stationary relative to said building and disposed lengthwise along an intersection of a wall and a floor of said building to form a conduit, said conduit defining a plurality of spaced apart slits running substantially parallel to a longitudinal length of said conduit to receive said vermin into said conduit, said conduit defining a downstream opening to expel said vermin out through said conduit;
    a vacuum pump in fluid communication with said conduit;
    a touch-sensitive switch responsive to said vermin located in said conduit, said touch-sensitive switch having two conductors that are spaced apart from each other to define a gap therebetween, said touch-sensitive switch providing a feedback signal upon said vermin electrically coupling said two conductors together by bridging said gap;
    a vermin storage chamber in fluid communication with said conduit and said vacuum pump, said vermin storage chamber serving to retain said vermin that have been trapped by said trap;
    said molding having a reconnectable joint extending along a longitudinal length therefore to provide personal access inside said conduit for the purpose of maintenance and cleaning, and
    an automatic control that momentarily turns said vacuum pump on in response to said feedback signal while at least one of said plurality of upstream slits remains open when said vacuum pump is turned on to facilitate said vermin being sucked through said conduit, whereby said vermin are free to travel by their own efforts into said conduit when said vacuum pump is off, and whereby said trap repeatedly and intermittently sucks said vermin through said conduit on an ongoing basis even when said trap is left unattended.

* * * * *